(12) United States Patent
Sakauchi

(10) Patent No.: US 11,817,128 B2
(45) Date of Patent: Nov. 14, 2023

(54) MUSIC DATA EDITING DEVICE AND MUSIC DATA EDITING PROGRAM

(71) Applicant: AlphaTheta Corporation, Yokohama (JP)

(72) Inventor: Hideyuki Sakauchi, Yokohama (JP)

(73) Assignee: ALPHATHETA CORPORATION, Yokohama (JP)

( * ) Notice: Subject to any disclaimer, the term of this patent is extended or adjusted under 35 U.S.C. 154(b) by 43 days.

(21) Appl. No.: 17/594,541

(22) PCT Filed: Apr. 23, 2019

(86) PCT No.: PCT/JP2019/017181
§ 371 (c)(1),
(2) Date: Oct. 21, 2021

(87) PCT Pub. No.: WO2020/217301
PCT Pub. Date: Oct. 29, 2020

(65) Prior Publication Data
US 2022/0189510 A1  Jun. 16, 2022

(51) Int. Cl.
*G11B 27/036* (2006.01)
(52) U.S. Cl.
CPC .................. *G11B 27/036* (2013.01)
(58) Field of Classification Search
CPC ................................. G11B 27/036
See application file for complete search history.

(56) References Cited

U.S. PATENT DOCUMENTS

2002/0023529 A1* 2/2002 Kurakake ............ G10H 1/0058
84/610

FOREIGN PATENT DOCUMENTS

| JP | 4-11597 | 1/1992 |
| JP | 9-62261 | 3/1997 |
| JP | 2010-066336 | 3/2010 |
| JP | 2015-069047 | 4/2015 |

OTHER PUBLICATIONS

English translation of the International Preliminary Report on Patentability dated Sep. 28, 2021, Application No. PCT/JP2019/017181, 6 pages.

* cited by examiner

*Primary Examiner* — Girumsew Wendmagegn
(74) *Attorney, Agent, or Firm* — Rankin, Hill & Clark LLP

(57) ABSTRACT

A music data editing device includes: a music data player configured to play music data to which a unit section for playing a music piece is assigned; a unit section recorder configured to record the music data of every unit section in time series, the music data being currently played; and a unit section reader configured to read the unit section recorded by the unit section recorder.

4 Claims, 5 Drawing Sheets

MUSIC DATA EDITING DEVICE AND MUSIC DATA EDITING PROGRAM

TECHNICAL FIELD

The present invention relates to a music data editing device and a music data editing program.

BACKGROUND ART

A music sequencer, a DAW (Digital Audio Workstation), and the like have been known as devices that edit music data (for instance, see Patent Literature 1).

The music sequencer, the DAW, and the like display a trigger position, etc. on a screen of a computer along a time axis for each playing part of a music piece, allowing new music data to be generated by editing the trigger position, BPM (Beats Per Minute), etc. of each playing part.

By the way, in such a music data editing device, while playing parts of a new phrase are actually played by trial and error in units of bars or in compositional units such as a $1^{st}$ verse and a $2^{nd}$ verse of a music piece, a favorable phrase is sometimes discovered and phrase data is created by using it.

However, such phrase data created by trial and error is incidental phrase data. Thus, even if replaying of the phrase data is tried, the phrase data cannot be easily replayed.

Accordingly, a typical music data editing device is provided with an UNDO/REDO function to record and read music data in units of operations for music data, or a function to read music data, which is played by trial and error as by use of a DAW, from a playing start position to a playing end position thereof.

CITATION LIST

Patent Literature(s)

Patent Literature 1: JP 2010-66336 A

SUMMARY OF THE INVENTION

Problem(s) to be Solved by the Invention

However, due to an UNDO/REDO function or the like, an operation other than an operation related to a sound change is also read, which makes it difficult to efficiently seek a favorable phrase.

Further, the UNDO/REDO function, which is basically not intended to restore playing itself, is only capable of deliberate real-time recording. Thus, an operation performed by using the UNDO/REDO function cannot be recorded in synchronization with a progression timing of playing of a music piece.

In addition, in a case where recording is performed by use of a DAW, operations such as checking a recorded result on a screen, designating a playing start position and a playing end position, and playing and checking a corresponding part are repeated while it is unknown where a favorable phrase is recorded. Thus, it is likewise disadvantageously difficult to efficiently seek the favorable phrase.

An object of the invention is to provide a music data editing device and a music data editing program that enable a phrase discovered by trial-and-error playing to be easily replayed and favorable phrase data to be efficiently created.

Means for Solving the Problems

According to an aspect of the invention, a music data editing device includes: a music data player configured to play music data to which a unit section for playing of a music piece is assigned; a unit section recorder configured to record the music data of every unit section in time series, the music data being currently played; and a unit section reader configured to read the unit section recorded by the unit section recorder.

According to another aspect of the invention, a computer-readable music data editing program is configured to cause a computer to function as the music data editing device.

BRIEF DESCRIPTION OF DRAWING(S)

DESCRIPTION OF EMBODIMENT(S)

1. Concept of the Invention

An object of the invention is to record an operation or playing performed by an operator himself or herself and efficiently replay a recorded result for creation of a phrase of a music piece, thereby assisting in creating a new phrase of the music piece.

Figure 1:
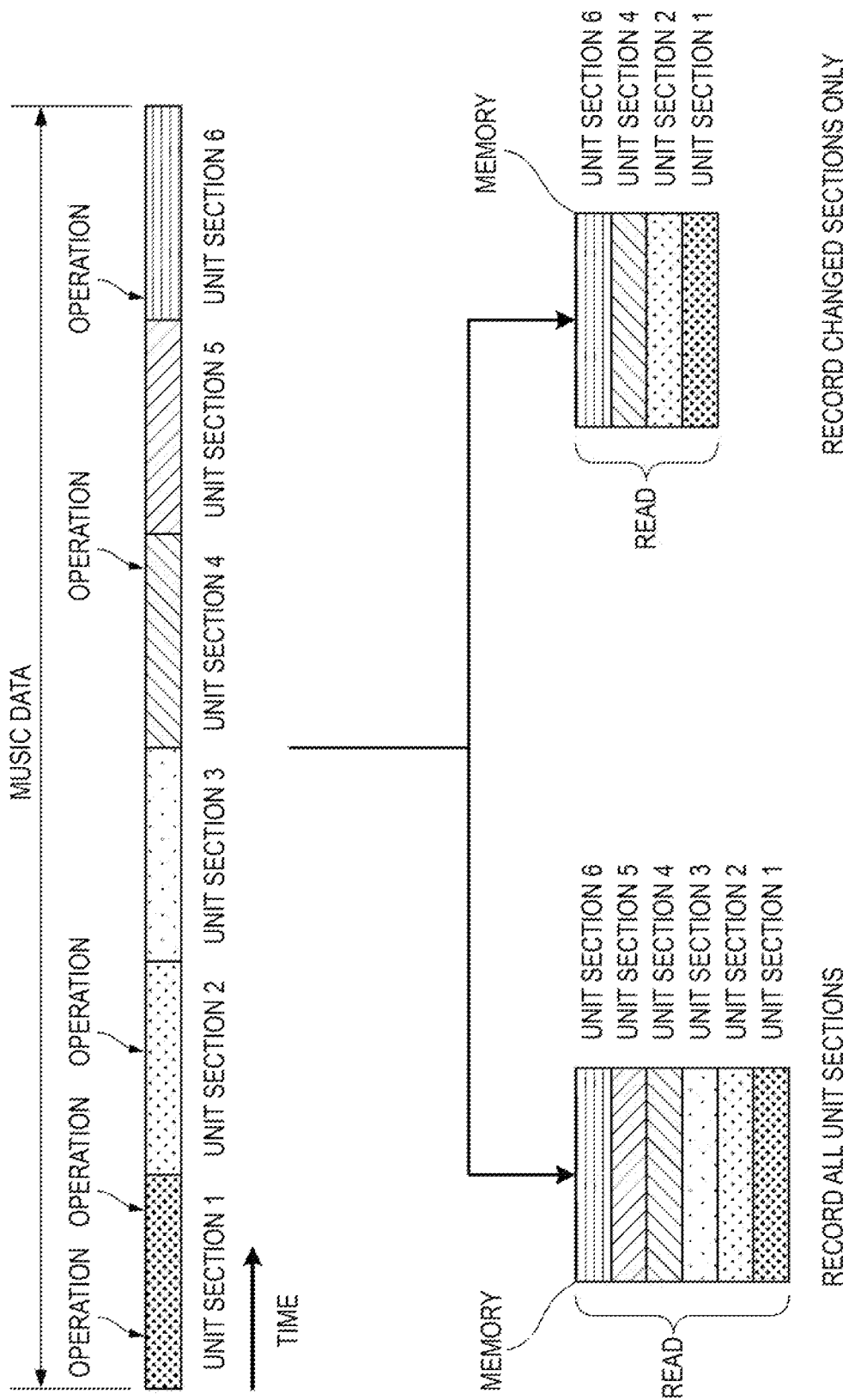
FIG. 1 is a schematic diagram of assistance in explaining a concept of the invention.

As shown in FIG. 1, unit sections are assigned to music data to be played according to the invention, which enables a music piece to be played every unit section.

The unit sections may be, for instance, units of bars such as one bar or two bars or music structural sections, that is, characteristic sections in a music structure, such as introduction, $1^{st}$ verse, $2^{nd}$ verse, and chorus.

According to the invention, while music data is played, the music data of every unit section is stored in a storage such as a memory in time series. At this time, operations (playing) performed by an operator (player) during playing the music data are recorded each unit section. Then, the unit section where an operation providing a phrase that seems favorable to the operator is discretionally and easily read and replayed, thereby efficiently creating a new phrase.

Operations according to the invention refer to operations for changing a playing direction and a playing speed, trigger timing, intensity, and length of note, key, chord, scale, and the like of music data.

A unit-section-based recording method according to the invention may be a method where all of the unit sections constituting music data are recorded in time series, a method where a unit section is recorded only in a case where a change occurs in the unit section as a result of a new operation being performed, or the like. Alternatively, recording may be always automatically performed or recording may be started with the assumption of an operation by an operator.

Regarding a method of reading a recorded unit section, an order of reading, such as FILO (First In Last Out) or FIFO (First In First Out), may be set by a device, or an operator may be allowed to recognize an order of recorded unit sections so that the operator can select the unit section at his or her discretion.

According to the invention, during playing music data, a variety of operations performed by trial and error by an operator are recorded each unit section. Further, phrase data, which contains the operations performed by trial and error, can be read each unit section. Thus, the operator can easily read and replay favorite one of the operations performed by trial and error and efficiently create new phrase data.

2. Exemplary Embodiment of the Invention

Next, description will be made on an exemplary embodiment of the invention with reference to the attached drawings.

Figure 2:
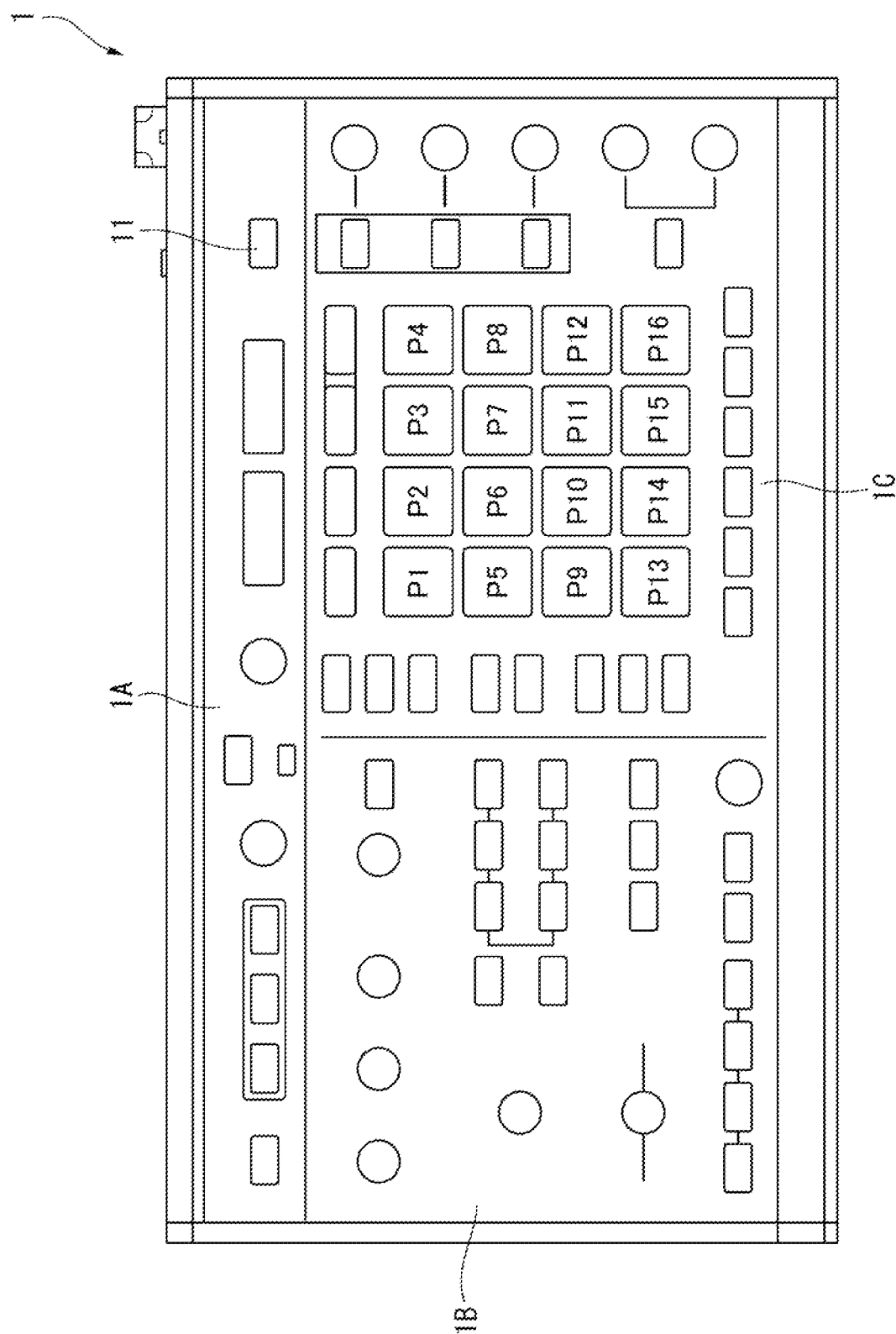
FIG. 2 is a plan view of an operation panel of a music sequencer according to an exemplary embodiment of the invention.

FIG. 2 shows a music sequencer 1 according to the exemplary embodiment of the invention. The music sequencer 1 is connected to electronic devices such as a MIDI keyboard, a drum machine, a synthesizer, and a sound module. The music sequencer 1 functions as a music data editing device configured to record music data inputted from an electronic musical instrument, edit the music data by, for example, changing a playing direction, a playing speed, trigger timing, intensity, length of note, a key, a chord, etc., and output the edited music data to the connected electronic musical instrument.

FIG. 2 shows an operation panel of the music sequencer 1. The operation panel is zoned into a whole setting area 1A, a phrase editing area 1B, and a unit section editing area 1C.

The whole setting area 1A, which is an area for setting the music sequencer 1 as a whole, is provided with a control switch 11 for calling a music data editing function according to the invention.

The phrase editing area 1B is an area for controlling a playing speed and a playing direction of currently played music data, and the like.

The unit section editing area 1C has two functions. In recording a unit section, it is possible to edit music data in terms of trigger timing, intensity, length of note, key, chord, and the like using operation elements including a pad.

In reading a unit section, a recorded unit section can be read and played using pad P1 to pad P16. The pad P1 to pad P16 are provided corresponding to respective unit sections. In response to the pads individually being operated, the unit section corresponding to the operated pad is read so that the read unit section can be edited. The unit section to be read in response to operation can be discretionally selected. For instance, in a case where one bar is defined as a unit section, unit sections corresponding to 16 bars can be read.

Figure 3:
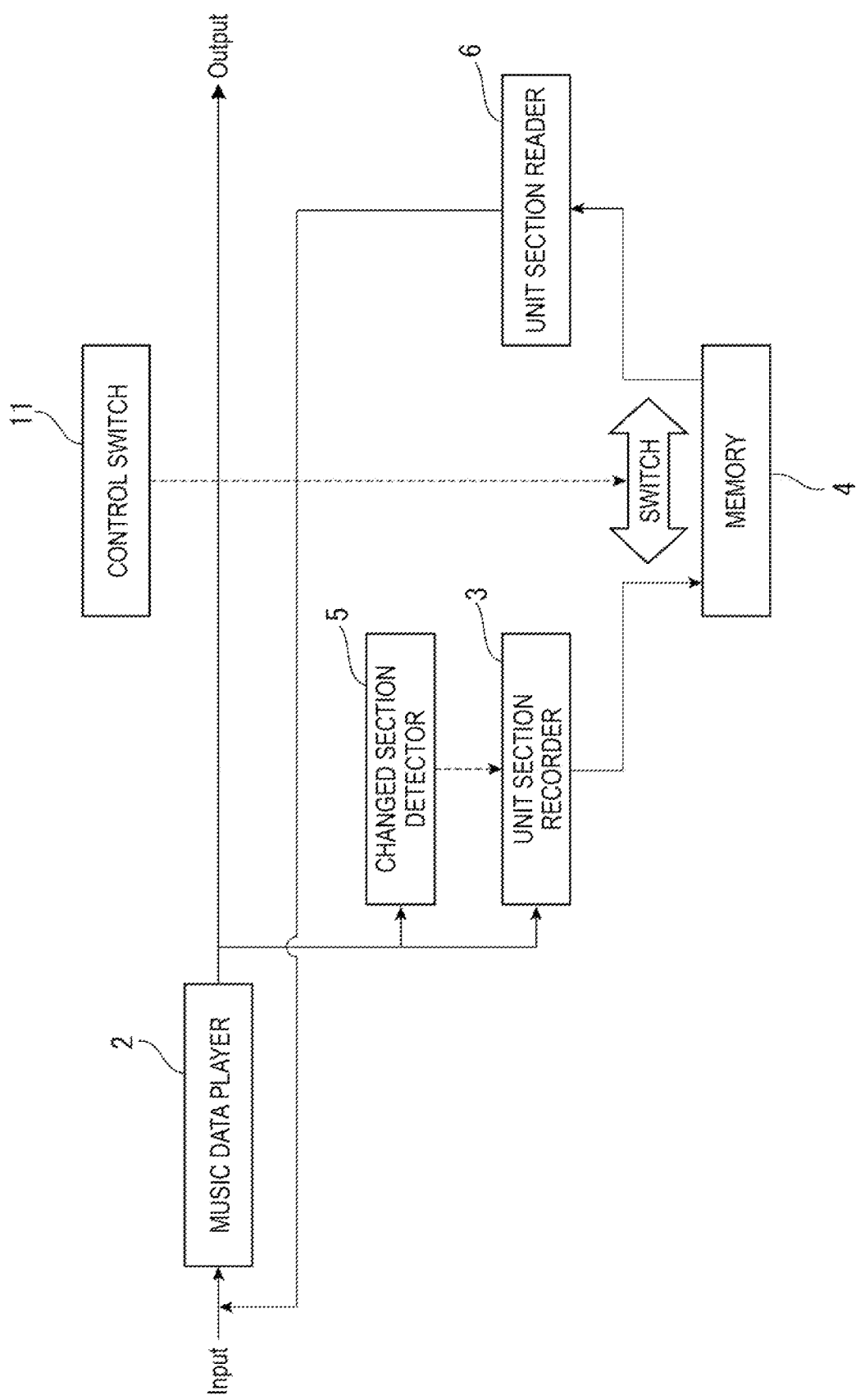
FIG. 3 is a functional block diagram showing a structure of the music sequencer in the exemplary embodiment.

FIG. 3 shows a function block diagram of the music sequencer 1 of the exemplary embodiment. The music sequencer 1 includes a music data player 2, a unit section recorder 3, a changed section detector 5, and a unit section reader 6. These functional means are provided as a computer-readable music data editing program to be executed on a computer.

The music data player 2 is configured to play music data. The music data is not particularly limited as long as bars are assigned as unit sections to the music data.

The music data player 2 is configured to externally output the music data edited by the music sequencer 1 in the form of a MIDI signal.

The unit section recorder 3 is configured to record the music data outputted from the music data player 2 every unit section in time series.

Specifically, the unit section recorder 3 is configured to record the played music data in a memory 4 every unit section in time series of writing.

The changed section detector 5 is configured to detect whether or not a change in playing operation occurs during the unit section currently played by the music data player 2.

A change in the playing operation is to be detected in accordance with whether or not a playing operation different from a previous playing operation is performed.

In the exemplary embodiment, examples of the different playing operation include a change in playing speed, a change in pitch of the currently played music piece, and a change resulting from input of a new scale tone.

Examples of the change in playing speed include a swing in playing speed, a change in playing tempo (BPM), and a change due to loop or jump.

Examples of the change in pitch of the currently played music piece include a change in key or chord and a change in pitch with a local change in playing tempo.

Examples of the change resulting from input of a new scale tone include input of a new scale tone resulting from an operator operating the MIDI keyboard and input of a scale tone changed by a music sensor at a prior stage.

The changed section detector 5 is configured to output, in response to detection of occurrence of a change in playing operation, the unit section where the change occurs to the unit section recorder 3 so that the unit section is recorded as a changed section.

The unit section reader 6 is configured to read and play the unit section recorded in the memory 4. Specifically, the unit section reader 6 is configured to read and play data of the unit section corresponding to, among the pad P1 to the pad P16 shown in FIG. 2, the pad operated by an operator. In other words, the pad P1 to the pad P16 function as a reading operation unit according to the invention, allowing for discretionary playing in accordance with which one of the pad P1 to the pad P16 is operated by the operator.

Switching between the functions of the unit section recorder 3 and the changed section detector 5 and the function of the unit section reader 6 is performed by switching the control switch 11.

At this time, the pad P1 to the pad P16 in the unit section editing area 1C are usable as an operation unit for editing music data in the music data player 2 in a case where the functions of the unit section recorder 3 and the changed section detector 5 are enabled.

In contrast, in a case where the function of the unit section reader 6 is enabled, the pad P1 to the pad P16 are usable as an operation unit for reading a unit section.

Figure 4:
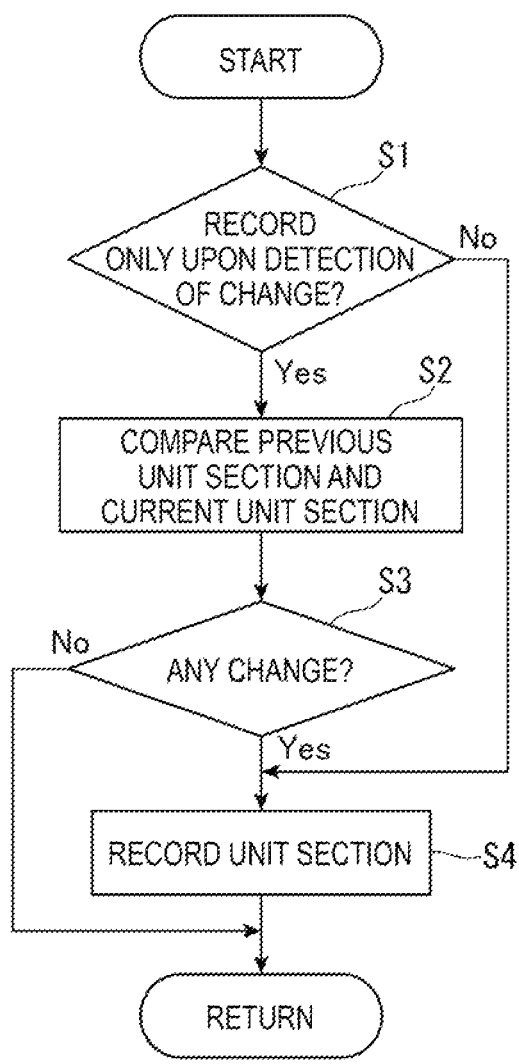
FIG. 4 is a flowchart for explaining effects of the exemplary embodiment.

Next, description will be made on effects of the exemplary embodiment with reference to flowcharts shown in FIG. 4 and FIG. 5.

The changed section detector 5 determines whether or not recording is to be performed only in a case where a change in playing operation occurs during a unit section (Step S1).

In a case where all the unit sections are to be recorded, the unit section recorder 3 records currently played music data every unit section in time series (Step S4).

The changed section detector 5 compares a previously played unit section and the currently played unit section (Step S2) and determines whether or not a playing operation is changed (Step S3).

In response to the playing operation being not changed, the changed section detector 5 performs Step S1 to Step S2 instead of recording the unit section, comparing a unit section to be newly played.

In response to the playing operation being changed, the changed section detector 5 informs the unit section recorder 3 of the change of the playing operation, and the unit section recorder 3 records the unit section where the playing operation is changed as a changed section in the memory 4. The same process is continued in time series (Step S4).

Figure 5:
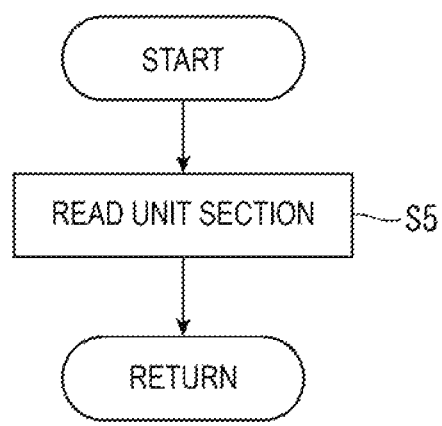
FIG. 5 is a flowchart for explaining effects of the exemplary embodiment.

With the control switch 11 switched, the unit section reader 6 reads and plays the unit sections recorded in the memory 4 as shown in FIG. 5 (Step S5). Specifically, the unit section reader 6 can read the unit sections recorded in time series in the memory 4 either in a FIFO order or in a FILO order that is for reverse playing. At this time, it is preferable that one of the pad P1 to the pad P16 corresponding to the currently played unit section be lighted.

In addition, an operator may be allowed to select the unit section to be read and played by operating one of the pad P1 to the pad P16 at his or her discretion.

Such an exemplary embodiment achieves the following effects.

In the exemplary embodiment, the unit section recorder 3 records the currently played music data in the memory 4 every unit section in time series. The unit section reader 6 can thus read and play any one of the unit sections recorded in the memory 4, which makes it possible to easily and efficiently replay a favorable phrase provided by an operation performed by trial and error by an operator during playing music data.

In the exemplary embodiment, the changed section detector 5 can record, in response to occurrence of a change in playing operation during a unit section, the unit section as a unit section. Data of the same unit section is thus prevented from being unnecessarily recorded, which makes it possible to replay a favorable phrase with a higher efficiency.

In the exemplary embodiment, the unit section reader 6 includes the reading operation unit including the pad P1 to the pad P16. An operator can thus read and play any one of the unit sections by operating the pad P1 to the pad P16, which makes it possible to play a favorable phrase with a higher efficiency.

The invention is not limited to the above-described exemplary embodiment and includes modifications described below.

In the above-described exemplary embodiment, the invention is applied to the music sequencer 1 connected to MIDI electronic devices; however, the scope of the invention is not limited thereto. An electronic device that inputs music data may be an electronic device such as a computer connected through a USB connector.

In addition, specific structures, shapes, and the like of the invention may be replaced with other structures, and the like as long as the object of the invention is achievable.

The invention claimed is:

1. A music data editing device comprising:
   a music data player configured to play music data to which a unit section for playing a music piece is assigned;
   a unit section recorder configured to record the music data of every unit section in time series, the music data being currently played;
   a unit section reader configured to read the unit section recorded by the unit section recorder; and
   a changed section detector configured to detect, as a changed section, the unit section in which a change in playing operation occurs while the music data is played,
   wherein the unit section recorder is configured to record the changed section detected by the changed section detector.

2. The music data editing device according to claim claim 1, wherein
   the changed section detector is configured to detect that the change in playing operation occurs based on a change in speed and a change in pitch of the currently played music piece and input of a scale tone.

3. The music data editing device according to claim 1, wherein
   the unit section reader comprises a reading operation unit corresponding to the unit section recorded by the unit section recorder, the unit section reader being configured to read, in response to an operator performing an operation on the reading operation unit, the unit section corresponding to the operation.

4. A non-transitory computer-readable recording medium recording a music data editing program configured to cause a computer to function as the music data editing device according to claim 1.

* * * * *